June 22, 1965  R. D. ZUEFELDT ETAL  3,191,171

RADAR HEIGHT SENSOR AND LOW ALTITUDE ALTIMETER

Filed Sept. 10, 1962

INVENTORS
RICHARD D. ZUEFELDT
DAVID D. ZAK
BY
Knox & Knox

United States Patent Office 3,191,171
Patented June 22, 1965

3,191,171
RADAR HEIGHT SENSOR AND LOW
ALTITUDE ALTIMETER
Richard D. Zuefeldt, Del Mar, and David D. Zak, San
Diego, Calif., assignors to The Ryan Aeronautical Co.,
San Diego, Calif.
Filed Sept. 10, 1962, Ser. No. 222,608
5 Claims. (Cl. 343—7)

This invention relates generally to radar altimeters, and particularly to an amplitude modulated radar altimeter designed for accuracy at low altitudes.

Background

Radar altimeter, in general, employ either pulse or frequency modulation techniques, both using the constant velocity of electromagnetic waves in space to measure altitude above any reflecting surface. Instead of using the constant velocity of electromagnetic waves, the invention disclosed herein employs amplitude modulation and uses an integral number of quarter-wave lengths of the modulation signal to measure altitude.

Pulse radar altimeters transmit a series of pulses of fixed width and repetition rate, and measure the time for a transmitted pulse to travel to a reflecting surface and return. Pulse radar altimeters are usually limited in operation to altitudes above about 50 feet, due principally to limitations imposed by pulse width and pulse repetition rate; although pulse radar altimeters are capable of measuring lower altitudes if the complex and expensive circuitry required for short pulses and fast repetition rate is supplied.

Frequency modulated continuous wave radar altimeters measure the elapsed time between transmitted and received signals, but use the difference in modulation frequency of the transmitted and received signals to indicate altitude. Frequency modulated radar altimeters are unreliable below about 15 feet, some limiting factors being the quantized indications provided by a periodic modulation frequency, the problem of isolation of the transmitting and receiving antennas, and false indications provided by multipath reflections.

In any type of radar altimeter, isolation of the antennas to reduce to a minimum the direct leakage signal from the transmitting antenna to the receiving antenna, is necessary. The isolation problem becomes particularly difficult at low altitudes where a very short time elapses between transmitted and received signals.

In piloted circuit, accuracy of altimeters at very low altitudes is of no concern because the pilot is able to exercise control without reference to an altimeter. For this reason, radar altimeters used on conventional aircraft are not designed to operate reliably at very low altitudes.

In pilotless aircraft and other automatically controlled vehicles, however, a reliably accurate automatic indication of true height at low altitudes is necessary for landing safely, maintaining a constant low altitude, or performing other functions at a fixed reference altitude.

In the instant invention we employ a technique using amplitude modulation and the phase difference between transmitted and received signals to indicate altitude.

An amplitude modulated radar altimeter with a modulation frequency equal to $f$ is used. A reference altitude is thereby established in accordance with the formula:

$$a = \frac{nV}{4f}$$

where:

$a$ = reference altitude in feet.
$n$ = an integer greater than zero.
$V$ = velocity of electromagnetic waves in space in feet per second.
$f$ = modulation frequency in cycles per second.

A modulation frequency of 49.2 mc., for example, establishes a reference altitude of 5 feet when the integer, $n$, is 1; and provides modulation envelopes for the transmitted and received signals that are 180 degrees out of phase.

One important advantage of this technique is the elimination of interference from the transmitting antenna direct leakage signal. At the reference altitude the modulation envelope of the received signal is always 180 degrees or 360 degrees out of phase with the modulation envelope of the transmitted signal. Consequently, the leakage signal may decrease or increase the amplitude but does not alter the phase of the received signal. Since the phase difference provides the altitude indication, the leakage signal is eliminated as a factor in limiting the accuracy of the altimeter.

Deviations above and below the measured altitude cause phase deviations above and below 180 degrees or 360 degrees. These phase deviations may be sensed and translated into control signals for maintaining a vehicle at the reference altitude or preforming other functions with reference to a fixed altitude.

Also, it is possible to feed the control signals back to the modulation signal source and change the modulation wave length to conform to the true altitude, using the changed modulation wave length to indicate true altitude.

This method of modulation and altitude measurement avoids the limitations of pulse radar and frequency modulation radar altimeters, as discussed briefly above, and provides reliable and accurate true height indications at very low altitudes.

Otherwise stated, the invention disclosed herein, is an amplitude modulated radar height sensor and low altitude altimeter that uses an arbitrarily selected modulation, so that an integral number of quarter-wave lengths of the modulation signal equals the desired altitude of the transmitter above the reflecting surface, and senses the phase difference between the modulation envelopes of the transmitted and received signals to generate control signals that may be used for performance of control functions to maintain such a fixed altitude, or, alternatively, to indicate true altitude.

Objects

It is therefore a principal object of this invention to avoid hitherto experienced difficulties in low altitude altimeters, and to provide a radar height sensor that senses height deviations above and below an arbitrarily selected, fixed height by transmitting and receiving an amplitude modulated signal, the modulation signal being an integral number of quarter-wave lengths at the fixed height.

It is another object of this invention to provide a low altitude radar altimeter that senses altitude changes by transmitting and receiving an amplitude modulated signal, the modulation signal being continuously variable to equal an integral number of quarter-wave lengths at the true altitude.

With these and other objects definitely in view, this invention consists in the novel combination and arrangement of elements as will be hereinafter fully described in the specification, particularly pointed out in the claims, and illustrated in the drawings, that form a material part of this disclosure, and of which:

Description

Figure 1:
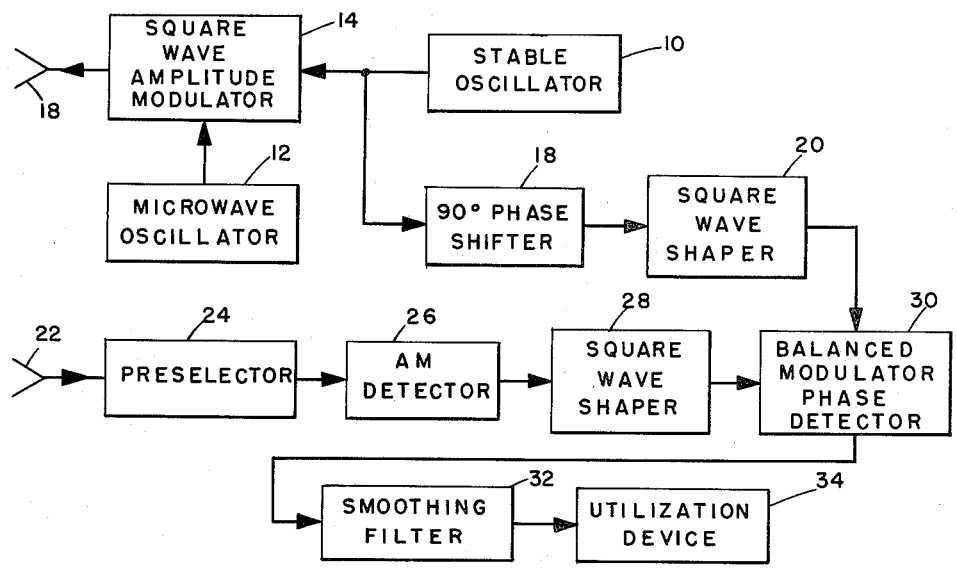
FIGURE 1 is a functional block diagram of the radar height sensor embodiment.

In the radar height sensor, referring to FIGURE 1, stable oscillator 10 generates sine wave oscillations at a fixed frequency selected to equal on integral number of quarter-wave length at a fixed reference height, and microwave oscillator 12 generates sine wave oscillations at a fixed carrier frequency The outputs of oscillators 10 and 12 are combined in square wave modulator 14, where the sine waves of oscillator 10 are converted into square waves that amplitude modulate the carrier frequency output of oscillator 12. The amplitude modulated output of modulator 14, then, is radiated by directional antenna 16 toward a reflecting surface, such as water or land.

A portion of the sine wave output of oscillator 10 also is shifted 90 degrees by 90 degree phase shifter 18, and fed to square wave shaper 20, where the sine waves are converted into square waves of constant amplitude.

The reflected signal is received by directional antenna 22, amplified by preselector 24, and fed to AM detector 26. Here the amplitude modulation is separated from the carrier signal and fed to square wave shaper 28, where the modulation signal is shaped to approximately the same form and amplitude as the output of square wave shaper 20. The outputs of square wave shaper 20 and 28, then, are combined in balanced modulator phase detector 30.

Assuming the radar height sensor is at the fixed reference height corresponding to the wave length of the modulation signal, and the wave length is four times the fixed reference height, the modulation envelope of the received signal is exactly 180 degrees out of phase with the modulation envelope of the transmitted signal; and since the output of stable oscillator 10 is shifted 90 degrees by 90 degree phase shifter 18, the outputs of square wave shapers 20 and 28 are exactly 90 degrees out of phase. Under these conditions, the output of balanced modulator phase detector 30 is zero.

Now, assume the radar height sensor is shifted above or below the fixed reference height as discussed above. Under these conditions, the output of square wave shaper 28 is now less or more than 90 degrees out of phase with the output of square wave shaper 20, and the output of balanced modulator phase detector 30 is negative or positive by a magnitude proportionate to the deviation from the fixed reference height.

The output of balanced modulator phase detector 30 is converted into a voltage of uniform variation by smoothing filter 32, and fed to utilization device 34, which may be a control mechanism for keeping a vehicle at the fixed reference height, or for performing other functions with respect to the fixed reference height.

Figure 2:
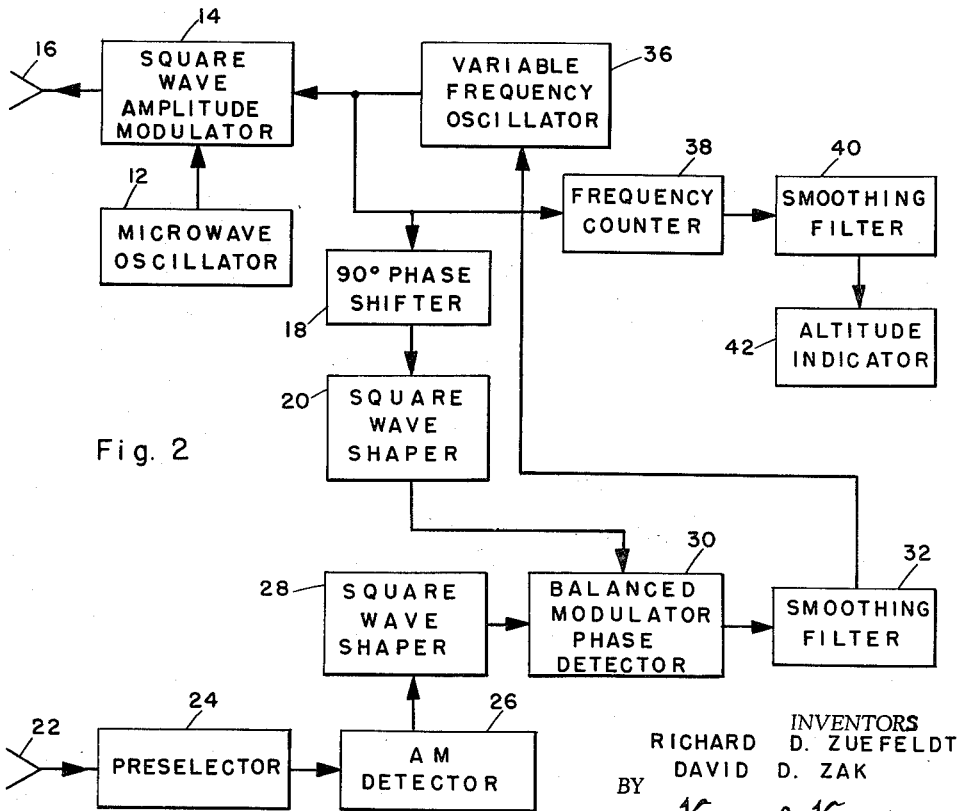
FIGURE 2 is a functional block diagram of the low altitude radar altimeter embodiment.

In the low altitude altimeter embodiment of this invention, shown in FIGURE 2, the structure and operation of components 10-32 are the same as in the radar height sensor, except that stable oscillator 10 is replaced by variable frequency oscillator 36.

The output of smoothing filter 32, instead of being fed to a utilization device, is fed back to variable frequency oscillator 36, where deviations in altitude change the oscillator frequency to equal an integral number of quarter wave lengths at the true altitude. As a result, the corrected frequency of the oscillator provides an accurate measurement of the true altitude.

The output of variable frequency oscillator 36 is converted into a voltage of uniform variation by frequency counter 38 and smoothing filter 40; and the voltage variations are translated into altitude variations by altitude indicator 42.

It is understood that minor variation from the form of the invention disclosed herein may be made without departure from the spirit and scope of the invention, and that the specification and drawings are to be considered as merely illustrative rather than limiting.

We claim:

1. A low altitude radar altimeter having a transmitter transmitting signals that are amplitude modulated by a variable frequency oscillator at a wave length such that the true altitude of the transmitter from a reflecting surface equals an integral number of quater-wave lengths, in accordance with the formula $$a = \frac{nV}{4f}$$

where $a$ is height, V is the velocity of electromagnetic waves, $f$ is frequency, and $n$ is an integer greater than zero; a receiver receiving reflected signals, said receiver having means for sensing the phase difference between the modulation envelopes of the transmitted and received signals, means for applying the phase difference to change the frequency of said variable frequency oscillator as necessary to conform to said formula, and means for applying the output of said variable frequency oscillator to indicate true altitude.

2. A low altitude radar altimeter having a transmitter transmitting signals that are amplitude modulated by a variable frequency oscillator at a wave length that equals four times the altitude of the transmitter from a reflecting surface;

a receiver receiving reflected signals with modulation envelopes approximately 180 degrees out of phase with the modulation envelopes of the transmitted signals, said receiver having means for translating the phase difference between the two modulation envelopes above and below 180 degrees into correction signals that change the frequency of said variable frequency oscillator so that the two modulation envelopes are exactly 180 degrees out of phase, and means for applying the output of said variable frequency oscillator to indicate true altitude.

3. The combination of claim 2 in which the modulation envelope is a periodic, square wave form.

4. Apparatus according to claim 3, comprising:

an amplitude modulated radar transmitter and receiver, including separate antennas;

said antennas being located close together so that the direct leakage signal resulting from the transmitted signal does not alter the phase of the received signal;

said transmitter including a square-wave modulator that provides an amplitude modulated transmitter output signal, a variable frequency oscillator that triggers said square-wave modulator at a frequency providing a wave length approximately four times the altitude of the transmitter from a reflecting surface, means for shifting the output of said oscillator 90 degrees, means for changing the shifted output to a square-wave form with uniform amplitude; means for changing the frequency of said oscillator in conformance with changing altitude, means for converting the output of said oscillator into smooth voltage variations, and means for utilizing said voltage variations to indicate true altitude;

said receiver including means for demodulating the signal received as a result of the transmitted signal being reflected by a reflecting surface, means for amplifying and changing the output of said means for demodulating to a square-wave form at essentially the same amplitude as the shifted square wave output of said oscillator, a phase detector having as inputs the square-wave output of said means for demodulating and the shifted square-wave output of said oscillator, means for converting the output of said phase detector into smooth voltage variations, and means for connecting said voltage variations to said means for changing the frequency of said oscillator in conformance with changing altitude.

5. A radar height sensor, comprising:

an amplitude modulated radar transmitter and receiver having separate antennas;

said antennas being located close together so that the direct leakage signal resulting from the transmitted signal does not alter the phase of the received signal;

said transmitter including a square-wave modulator providing an amplitude modulated output signal, a stable oscillator that triggers said square-wave modulator at a wavelength equal to four times an arbitrarily selected height of the transmitter from a reflecting surface, means for shifting the output of said stable oscillator 90 degrees, and means for changing the shifted output to a square-wave form with uniform amplitude;

said receiver receiving reflected signals with modulation envelopes approximately 180 degrees out of phase with the modulation envelopes of the transmitted signals and including means for demodulating the signal received as a result of the transmitted signal being reflected by a reflecting surface, means for amplifying and changing the output of said means for demodulating to a square-wave form at essentially the same amplitude as the shifted square-wave output of said stable oscillator, a phase detector having as inputs the square-wave output of said means for demodulating and the shifted square-wave output of said stable oscillator, means for translating the output of said phase detector into smooth voltage variations corresponding to phase differences above and below 180 degrees and representing height deviation indications, and means for utilizing said voltage variations as control signals, using as reference said arbitrarily selected height.

References Cited by the Examiner
UNITED STATES PATENTS

| | | | |
|---|---|---|---|
| 1,406,996 | 2/22 | Morrill | 343—105 |
| 1,756,462 | 4/30 | Jenkins | 343—112.2 |
| 2,705,319 | 3/55 | Dauber | 343—7 |

FOREIGN PATENTS

| | | |
|---|---|---|
| 472,891 | 9/37 | Great Britain. |
| 744,535 | 2/56 | Great Britain. |

CHESTER L. JUSTUS, *Primary Examiner.*